United States Patent [19]

Toth et al.

[11] 4,400,040
[45] Aug. 23, 1983

[54] TAPERED ROLLER BEARING WITH IMPROVED LUBRICATING MEANS

[75] Inventors: David G. Toth, Canton; Robert S. Trump, Bolivar; Robert L. Leibensperger, Canton, all of Ohio

[73] Assignee: The Timken Company, Canton, Ohio

[21] Appl. No.: 321,386

[22] Filed: Nov. 16, 1981

[51] Int. Cl.³ .................... F16C 33/58; F16C 33/46
[52] U.S. Cl. ................................ 308/187; 308/216; 308/217; 308/218
[58] Field of Search .............. 308/187, 218, 217, 216, 308/214, 36.4

[56] References Cited

U.S. PATENT DOCUMENTS

| | | |
|---|---|---|
| 1,798,139 | 3/1931 | Boland . |
| 2,217,801 | 10/1940 | Katcher . |
| 2,217,801 | 10/1940 | Katcher .............................. 308/187 |
| 2,838,348 | 6/1958 | Hamm . |
| 3,085,338 | 4/1963 | Patterson . |
| 3,528,711 | 9/1970 | Atkinson . |
| 3,531,167 | 9/1970 | Edge et al. ......................... 308/187 |
| 3,628,835 | 12/1971 | Cornish et al. ..................... 308/214 |
| 3,811,743 | 5/1974 | Wren ................................. 308/187 |
| 4,120,541 | 10/1978 | Schiemann . |
| 4,136,916 | 1/1979 | Musselman et al. ................ 308/216 |
| 4,319,789 | 3/1982 | Irwin ................................ 308/217 |

FOREIGN PATENT DOCUMENTS

| | | | |
|---|---|---|---|
| 33-13202 | of 1958 | Japan . | |
| 2069628 | 8/1981 | United Kingdom ................ 308/218 |

*Primary Examiner*—John M. Jillions
*Assistant Examiner*—Thomas R. Hannon
*Attorney, Agent, or Firm*—Gravely, Lieder & Woodruff

[57] ABSTRACT

To enable a single row tapered roller bearing to receive adequate lubrication at critical surface areas while operating at moderate to high speeds, the thrust rib on the cone of the bearing is fitted with a lubricating ring that in combination with the rib forms an inwardly opening trough and a plurality of channels that lead from the trough and over the thrust rib so that the ends of the channels open toward the large diameter ends of the tapered rollers. Alternatively, the lubricating ring may be the thrust rib, with the channels extending beneath it and opening toward the large diameter ends of the rollers. A lubricating oil is introduced into the trough, and the centrifugal forces that are exerted on this oil through rotation of the cone causes the oil to flow through the channels and discharge against the large end faces of the rollers. The flow of oil is sufficient to create an oil film between the end faces of the rollers and the abutment face of the thrust rib, thus facilitating proper lubrication of these critical surface areas, even when the cone revolves at high speeds. The cage, which maintains the proper spacing between the rollers, may be provided with grooves and otherwise configured to catch some of the oil discharged from the channels that extend along the lubricating ring. These grooves, direct the oil axially through the bearing and allow it to flow outwardly onto the cup raceway where it is further distributed to the roller side faces and the cone raceway.

17 Claims, 16 Drawing Figures

TAPERED ROLLER BEARING WITH IMPROVED LUBRICATING MEANS

BACKGROUND OF THE INVENTION

This invention relates in general to antifriction bearings and more particularly to an antifriction bearing having improved lubricating capabilities for high speed operation.

Tapered roller bearings offer many advantages over other types of bearings, one of the more important being the ability to carry high thrust loads as well as high radial loads. The tapered design requires a thrust rib at the large end faces of the rollers to keep the rollers in position and alignment, the rib usually being a part of the cone or inner race. The nature of the contact between the rib and the roller end faces is such that a combination of rolling and sliding occurs, as opposed to the pure rolling contact between the roller side faces and the raceways. Due to this element of sliding at the rib-roller end contact, it becomes the critical area for lubrication, and the one where damage is most likely to initiate when lubrication is inadequate.

At low speeds, bearing rotation creates turbulence and churning of the lubricant which keeps all surfaces covered with adequate lubricant films. As speeds increase above about 5000 ft/min cone rib circumferential velocity, the centrifugal forces acting on the lubricant may tend to prevent lubricant from reaching the cone rib-roller end contact, thereby causing a starvation condition and allowing damage to initiate or occur.

Heretofore, various lubricating devices have been developed for in one way or another directing additional lubricating oil to the faces of the cone thrust ribs against which the large ends of the rollers bear in tapered roller bearings. While these devices enable the bearings to operate more satisfactorily at higher speeds, all have disadvantages of one type or another. For example, one way to improve the lubrication at the thrust rib is to provide the cone with oil holes or ports that extend axially through the rib to the face against which the rollers bear or perhaps radially through the cone to the rib face (see U.S. Pat. Nos. 3,811,743 and 2,217,801). The holes, however, must be accurately located, quite small, and placed at frequent intervals. They require additional machining operations which are very time consuming and may further complicate subsequent process steps such as heat treatments. Another approach is the curved oil dam located opposite the large diameter ends of the rollers. In this approach oil is pumped through the bearing in the normal manner by the tapered rollers, but instead flowing free of the bearing at the large end of the cup raceway, it is turned back inwardly by a curved dam so that it wets the large diameter ends of the rollers. The oil, however, is churned within the bearing and also absorbs heat from the regions of rolling contact along the raceways. It therefore is at an elevated temperature by the time it reaches the large ends of the rollers. Still another approach involves incorporating oil ducts or channels within the metal cage that maintains the correct spacing between the tapered rollers (see U.S. Pat. No. 3,628,835). The ducts or channels run along the cage bridges and convey the oil from the small end of the cage to the large end where they direct it against the large rib face of the cone. Metal cages of this nature are expensive to manufacture, and because of the clearances involved, it is difficult to position the discharge ends of the ducts close to the cone thrust rib. This could diminish the amount of lubrication reaching the cone thrust rib.

SUMMARY OF THE INVENTION

One of the principal objects of the present invention is to provide an antifriction bearing that is lubricated sufficiently to operate at moderate to high speeds. Another object is to provide a tapered roller bearing with means for directing lubricating oil against the large diameter end faces of the tapered rollers without passing the oil through the interior of the bearing. Another object is to provide a bearing of the type stated which is simple in construction and economical to manufacture. Another object is to provide a bearing of the type stated with means for effectively cooling the cone thrust rib and roller large diameter end to establish and maintain thermal equilibrium and assure satisfactory operating temperatures, thus minimizing the risk of overheating and subsequent surface damage such as scoring.

An additional object is to provide a bearing of the type stated that is ideally suited for mounting machine tool spindles and other applications as well. Still another object is to provide a lubricating device that may be easily attached to a conventional tapered roller bearing to provide the bearing with improved lubricating capabilities. Yet another object is to provide a bearing of the type stated with a cage that conveys the lubricant from the region of the roller large end faces to the raceways and roller side faces. These and other objects and advantages will become apparent hereinafter.

The present invention is embodied in a bearing having rolling elements and a race that is provided with a raceway along which the rolling elements roll and also a generally axially directed surface beyond the raceway. A lubricating ring is mounted on the axial surface and this ring encloses a trough and channels which lead from the trough and open toward the rolling elements. Also, the invention includes a tapered roller bearing having lubricant supplying means at the large end of its rollers and a cage provided with lubricant distributing means for collecting lubricant that is discharged in the region of the large ends of the rollers and for directing that lubricant to the cup raceway. The invention also consists in the parts and in the arrangements and combinations of parts hereinafter described and claimed.

DESCRIPTION OF THE DRAWINGS

In the accompanying drawings which form part of the specification and wherein like numerals and letters refer to like parts wherever they occur

DETAILED DESCRIPTION

Referring now to the drawings, a single row tapered roller bearing A (FIG. 1), which has an axis X of rotation, includes the usual cone 2, cup 4 surrounding the cone 2, a complement of tapered rollers 6 between the cone 2 and cup 4, and cage 8 for maintaining the correct spacing between the rollers 6 and for further retaining the rollers 6 around the cone 2 when the cone 2 is withdrawn from the cup 4. In addition, the bearing A has a lubricating ring 10 which fits onto the cone 2 and directs a continuous stream of lubricating oil to critical surface areas of the bearing A, particularly when the bearing A is operating at moderate to high speeds, that is at speeds above about 5000 ft/min cone rib circumferential velocity.

Figure 1:
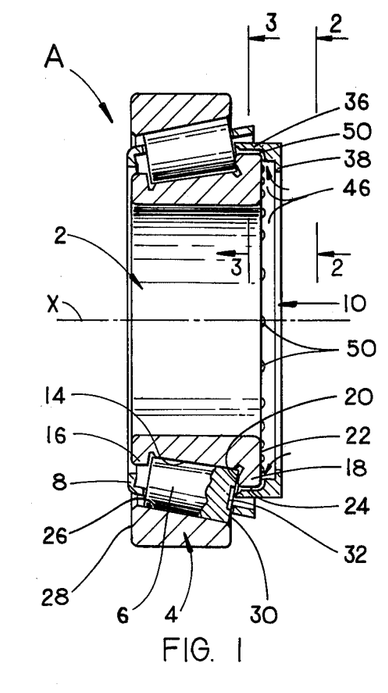
FIG. 1 is a sectional view of a tapered roller bearing provided with a lubricating ring constructed in accordance with and embodying the present invention.

The cone 2 has an outwardly presented raceway 14 that is tapered, and at the small end of the raceway 14 it is provided with retaining rib 16, while at the large end it has a thrust rib 18. Both ribs 16 and 18 project radially beyond the raceways 14 and form an integral part of the cone 2. The two ribs 16 and 18 together with the cage 8 retain the rollers 6 on the raceway 14 when the cone 2 is removed from the cup 4, so that the cone 2, the rollers 6 and the cage 8 are united into a cone assembly. The thrust rib 18 further prevents the tapered rollers 6 from being expelled from the annular space between the cup 4 and the cone 2 when the bearing A is subjected to radial or thrust loads. The circumferential velocity of the thrust rib 18 is used as a measure of the bearing speed, at least for the purpose of analyzing the effectiveness of bearing lubrication, and moderate to high speeds are generally considered to be above about 5000 ft/min.

Considering the thrust rib 18 in more detail, it has an abutment face 20 (FIGS. 1 & 4) located adjacent to the large end of the cone raceway 14, and it is against this face that the large ends of the tapered rollers 6 bear as the rollers 6 roll along the raceway 14. The cone 2, of course, has a back face 22 through which thrust loading is taken, and the back face 22 is extended outwardly along the thrust rib 18 to form the opposite side of the rib 18. The back face 22 is squared off with respect to the axis of rotation x. In addition, the thrust rib 18 has a cylindrical outwardly presented surface 24 that extends between the abutment face 20 and the back face 22 and is concentric to the axis of rotation x.

The cup 4 has an inwardly presented tapered raceway 26 (FIG. 1) that extends essentially from one end of the cup 4 to the other. At the small diameter end of its raceway 26, the cup 4 is further provided with a back face 28 that is squared off with respect to the axis x of rotation. Like the back face 22 of the cone 2, thrust loading is taken through the back face 28 of the cup 4.

The tapered rollers 6 fit in the annular space between the cone raceway 14 and the cup raceway 26 and contact those raceways along their tapered side faces, there being essentially line contact between the side face of each roller 6 and the two raceways 14 and 26. Moreover, the rollers 6 as well as the raceways 14 and 26 between which they are located are on apex, meaning that if each were extended to an apex, those apexes would be at a common point along the axis x of rotation. At its large diameter end, each roller 6 has a spherical end face 30 that is convex and may contain a recess 32 that opens out of the center of the end face 30. The spherical end faces 30 bear against the abutment face 20 on the thrust rib 18 of the cone 2, and accordingly the thrust rib 8 prevents the rollers 6 from being expelled from the space between the cone raceway 14 and cup raceway 26. In this regard, the geometry of the tapered roller bearing A, like any tapered roller bearing, is such that a radial load translates into a slight axial component at the rollers 6, and this axial component urges the rollers 6 toward the thrust rib 18. Indeed, were it not for the thrust rib 18, the rollers 6 would be forced out of the space between the cone 2 and cup 4. Thus, the large end faces 30 of the rollers 6 bear against the abutment face 20 on the thrust rib 18 as the cone 2 revolves within the cup 4.

The cage 8 rides beyond the pitch circle of the rollers 6, that is beyond the imaginary cone defined by the axes of the rollers 6, and it maintains the correct spacing between the rollers 6. It further retains the rollers 6 on the cone 2 when the cone 2 is removed from the cup 4.

The lubricating ring 10 (FIGS. 1-4) fits over the cylindrical surface 24 of the cone thrust rib 18 and serves as a manifold for directing a lubricating oil uniformly against the large diameter end faces 30 of the rollers 6. The rollers 6, in turn, carry a portion of the oil to the abutment face 20 of the thrust rib 18 so as to provide lubricant to maintain an oil film between the roller end faces 30 and the abutment face 20.

Figure 2:
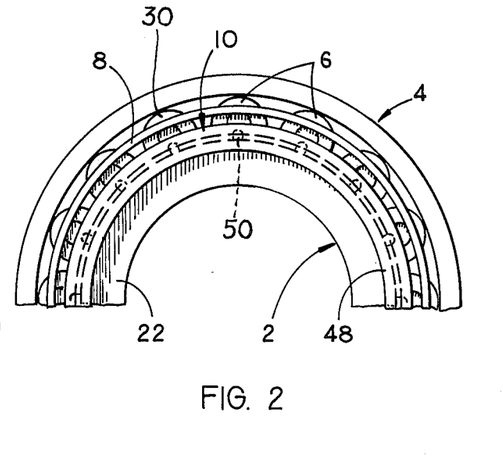
FIG. 2 is a partial end view of the bearing and lubricating ring taken along line 2—2 of FIG. 1.
Figure 3:
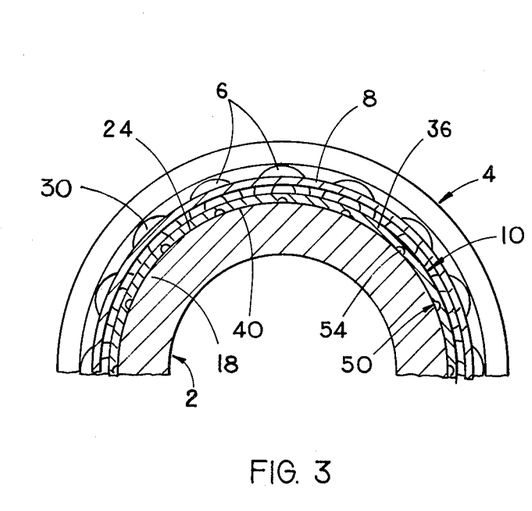
FIG. 3 is a sectional view of the bearing and lubricating ring taken along line 3—3 of FIG. 1.
Figure 4:
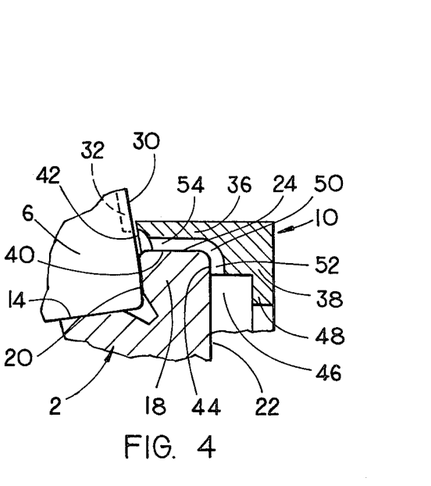
FIG. 4 is an enlarged sectional view showing the cone thrust rib, the abutting roller, and the lubricating ring.

The lubricating ring 10 in cross-section possesses a generally L-shaped configuration, it having an axial portion 36 and a radial portion 38 (FIG. 4). The axial portion 36 fits over the cylindrical surface 24 of the thrust rib 18, while the radial portion 38 extends inwardly along the cone back face 22. In this regard, the axial portion 36 has a cylindrical inwardly presented surface 40 that is slightly smaller in diameter than the cylindrical outer surface 24 of the thrust rib 18, so that the axial portion 36 fits tightly around the thrust rib 18. Indeed, the ring 10 is secured by nothing more than the interference fit between the inside surface 40 of the ring 10 and the outside surface 24 of the rib 18 (FIG. 3). The axial portion 36 extends all the way to the abutment face 20 of the thrust rib 18 where it terminates at an end face 42 (FIG. 4) that at its point of farthest projection is no more than flush with the abutment face 20. As a consequence, the axial portion 36 of the ring 10 does not interfere with the movement of the rollers 6 around the cone 2. The end face 42 may be concave (as illustrated), beveled, or straight, but irrespective of its configuration it is located in close proximity to the large end face 30 of the rollers 6. Moreover, the axial portion 36 is thin enough to extend into the space circumscribed by the large diameter end ring of the cage 8 with considerable clearance between the two so that the lubricating ring 10 does not interfere with the rotation of the cage 8 (FIGS. 2 & 3).

The axial and radial portions 36 and 38 merge at a shoulder 44 (FIG. 4) which abuts against the back face 22 of the cone 2 and thereby serves to locate the lubricating ring 10 on the thrust rib 18 of the cone 2. Inwardly from the shoulder 44 the radial portion 38 is cut away to provide an annular trough 46 that opens inwardly toward the axis x of rotation, one side of the trough 46 being formed by the cone back face 22, while the other side is bounded by a lip 48 that is part of the radial portion 38. The inside or smallest diameter of the lip 48 is greater than the diameter of the bore for the cone 2, but less than the diameter of the cylindrical rib surface 24 and the ring end face 42 as well.

Extending from the trough 46 all the way to the end face 42 are lubricant channels 50 (FIGS. 1, 3 & 4) which are located at equal and closely spaced intervals around the ring 10. Each channel 50 begins with a radial section 52 (FIG. 4) that opens out of the shoulder 44 for the radial portion 38 of the ring 10. It also includes an axial section 54 that opens out of the cylindrical inwardly presented surface 40. Hence the radial section 52 is in the radial portion 38 of the ring 10, whereas the axial section 54 is in the axial portion 36. The channels 50, of course, extend along the cone back face 22 and then along the cylindrical surface 24 of the thrust rib 18 and indeed are closed along their sides by those surfaces. The ends of the channels 50 open axially at equally spaced intervals through the end face 42 of the axial portion 36 and hence are directed at the large diameter end face 30 of the rollers 6 as the rollers 6 revolve around the cone raceway 14.

The lubricating ring 10 is installed on the cone 2 merely by pressing its axial portion 36 over the cone thrust rib 18 until the shoulder 44 on the radial portion abuts against the cone back face 22. Alternatively, the ring 10 may be located by use of a suitable fixture, and need not depend on the shoulder 44 achieving the proper location. The ring 10 may be machined from a solid metal ring or stamped from sheet metal. In either case, the channels 50 may be formed by milling, by grinding, with forming dies, or in an erosion process. The ring 10 may also be molded from a suitable polymer or from powdered metal. Irrespective of the material from which it is made or how it is made, the ring 10 is simple in construction and, therefore, easy to manufacture. It is also easy to install on a conventional tapered roller bearing.

In the operation of the bearing A the cone 2 revolves within the cup 4, and the rollers 6, being in contact with the cone and cup raceways 14 and 26, roll along those raceways 14 and 26. As a consequence, the contact that exists between the cone 2 and cup 4 is for the most part of a rolling nature, although some sliding does exist between the large diameter end faces 30 of the rollers 6 and the abutment face 20 of the thrust rib 18. In any event, relatively little torque is required to rotate the cone 2 and the shaft or spindle that it supports.

As the cone 2 rotates, a fluent lubricating oil from one or more nozzles (not shown) is directed into the trough 46 formed between the lip 48 on the ring 10 and the back face 22 on the cone 2. The oil, of course, is carried along with the cone 2 and ring 10, and the centrifugal force imparted to the oil causes it to flow outwardly and remain in the trough 46. Indeed, under the influence of the centrifugal forces acting on it, the oil enters the lubricant channels 50 at the radial sections 52 of those channels and flows outwardly to the axial sections 54 through which it likewise flows. The oil discharges from the channels 50 at the end face 42 of the axial portion 36 of the ring 10, and inasmuch as the end face 42 as well as the ends of the channels 50 that open out of it are presented toward the large diameter end faces 30 of the rollers 6, the oil is directed at those end faces. Indeed, some or all of the oil wets the roller end faces 30 and a portion of the oil is carried to the abutment face 20 of the thrust rib 18, thereby providing oil for generation of a thin film between the roller end faces 30 and the abutment face 20. Thus, the end faces 30 of the rollers 6 and likewise the abutment face 20 of the thrust rib 18 receive a continuous supply of lubrication even during high speed operation of the bearing A. Indeed, as the angular velocity of the cone 2 increases, the centrifugal force acting on the oil increases by an even greater magnitude, causing the oil to flow to the roller end faces 30 with substantially greater intensity.

Figure 5:
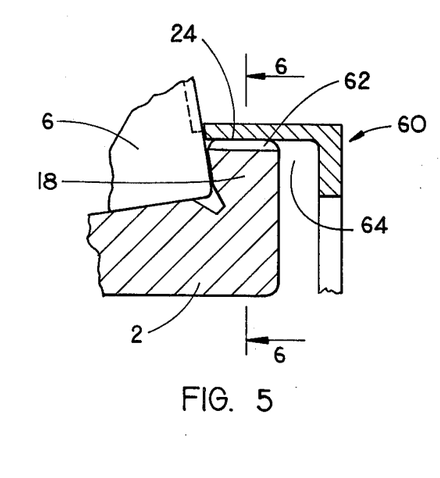
FIG. 5 is an enlarged sectional view of a modified bearing cone and lubricating ring also forming part of the present invention.
Figure 6:
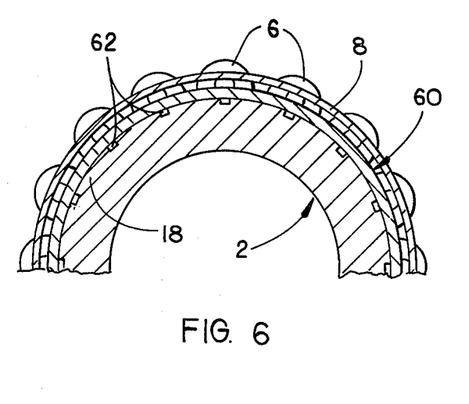
FIG. 6 is a partial sectional view of the modified cone and lubricating ring taken along line 6—6 of FIG. 5.

A modified lubricating ring 60 (FIGS. 5 and 6) has a simple L-shaped configuration and no lubrication channels. Instead the cone thrust rib 18 is provided with lubrication channels 62 which extend axially along and open out of its cylindrical surface 24 over which the ring 60 fits. Nevertheless, the ring 60 still encloses the sides of the channels 62 and likewise forms an inwardly opening trough 64 along the cone back face 22.

Figure 7:
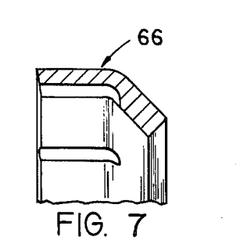
FIG. 7 is a sectional view of another modified lubricating ring.
Figure 8:
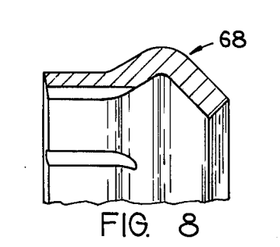
FIG. 8 is a sectional view of still another modified lubricating ring.

The lubricating ring need not be truly L-shaped, but instead may be a simple ring 66 (FIG. 7) that is bent inwardly beyond the thrust rib 18 at an oblique angle to the axis X to form a trough, or it may take the form of a somewhat more complex ring 68 (FIG. 8) that is directed outwardly immediately beyond the thrust rib 18 so that a portion of the trough lies beyond the outside surface 24 of the cone rib 18. It then is directed inwardly at an oblique angle.

In lieu of forming the thrust rib integral with the cone, it may be part of the lubrication ring. More specifically, a modified cone 70 (FIG. 9) has a tapered raceway 72 and a cylindrical surface 74 extended outwardly from the raceway 72 at the large diameter end of the raceway 72.

Figure 9:
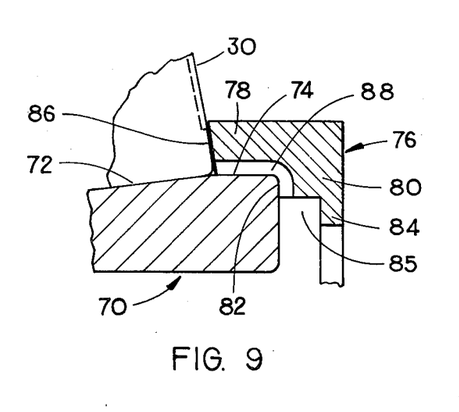
FIG. 9 is a sectional view of a modified bearing cone and a one-piece combined lubricating ring and thrust rib that fits over it.

Fitted over the cylindrical surface 74 is a lubricating ring 76 having an axial portion 78, and a radial portion 80. The latter has a shoulder 82 which locates the ring 76 on the modified cone 70, and a lip 84, which together with the back face of the cone 70 forms an inwardly opening trough 85 on the ring 76. The axial portion 78 fits tightly over the cylindrical surface 74 and ends at an abutment face 86 against which the large diameter ends 30 of the rollers 6 bear.

In addition, the ring 76 has channels 88 which extend from the trough 85 along the shoulder 82 and then along the axial portion 78. The channels 88 open out of the abutment face 86 on the ring 76 and thus discharge the oil directly in the region of contact between the roller end faces 30 and the abutment face 86. The cylindrical surface 74 and the cone back face together with the ring 76, enclose the sides of the channels 88.

Since the rollers 6 apply an axially directed force to the ring 76, the ring 76 and modified cone 70 should be clamped or otherwise securely joined together. This may be achieved by employing an interference fit, by fusing, by adhesive bonding, or by using mechanical securing devices such as set screws, clamping plates, and the like.

Figure 10:
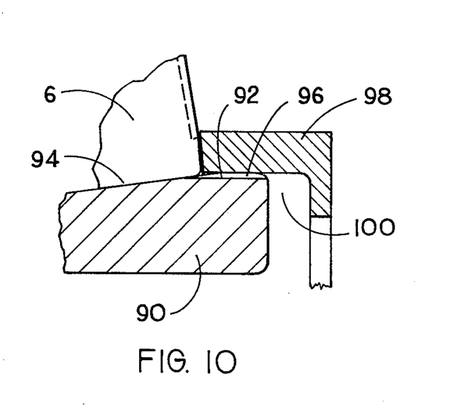
FIG. 10 is a sectional view of yet another modified cone and one-piece combined lubricating ring and thrust rib that fits over it.

In a slightly altered arrangement of the modified cone 70 and ring 76, the cone has the lubricant channels. More specifically, a modified cone 90 (FIG. 10) has an axially directed surface 92 leading up to its raceway 94. The surface 92 has channels 96 opening out of it, and the channels are enclosed by a lubricating ring 98 that serves as an abutment for the rollers 6. The ring 98, together with the cone 90 forms a trough 100 into which a lubricating oil is introduced. The ring 98 is joined to the cone 90 by an interference fit, by fusing, by adhesive bonding, or by a suitable mechanical device such as set screws, clamps or the like.

While the ring 10 provides adequate lubrication for the critical areas of contact between abutment face 20 of the thrust rib 18 and large end faces 30 of the tapered rollers 6, during moderate to high speed operation, it does little to enhance lubrication at the cone and cup raceway 14 and 26 along which the sides of the tapered rollers 6 move. The same holds true with regard to the modified rings 60, 66, 68, 76 and 98. The lubrication for these surfaces of the bearing may come from small oil jets positioned opposite to the cone retaining rib 16 and directed into the space between the cone 2 and cup 4—a conventional way of lubricating a tapered roller bearing. However, by substituting a distributing cage 110 (FIG. 11) for the conventional cage 8, it is possible to distribute lubrication to the raceway 14 and 26 without a separate nozzle at the small ends of the raceways 14 and 26.

Figure 11:
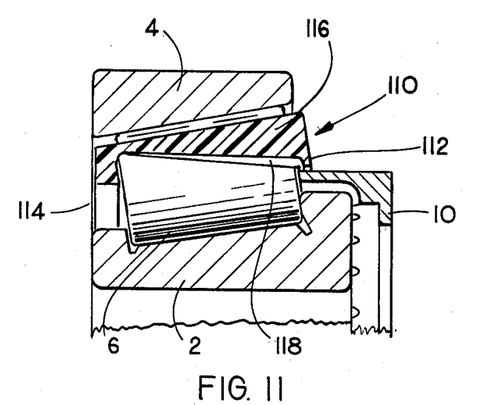
FIG. 11 is a sectional view of a tapered roller bearing constructed in accordance with the present invention and further having a distributing cage that collects lubricant discharged from the lubricating ring and directs that lubricant toward the cup raceway.

More specifically, the distributing cage 110 catches some of the lubricating oil that is discharged from the end of the channels 50 and conveys it to the cup raceway 26 where it is picked up by the sides of the tapered rollers and carried to the cone raceway 14. This oil is then pumped through the bearing in the usual manner. Like the conventional cage 8, the distributing cage 110 also maintains the correct spacing between the roller 6 and retains them on the cone 2 when the cone 2 is withdrawn from the cup 4.

The distributing cage 110 is molded entirely from a suitably polymer such as nylon and includes a large end ring 112 which surrounds the cone thrust rib 18 as well as the axial portion 36 of the lubricating ring. As such it extends across the large diameter end faces of the rollers 6. In addition the cage 110 has a small end ring 114 that encircles the retaining rib 16 and bridges 116 that extend between the end rings 112 and 114, forming pockets in which the rollers 6 are received. Each bridge 116 is for the most part located beyond the pitch circle for the rollers 6, that is beyond the imaginary cone formed by the axial center lines of the rollers 6 as they revolve about the cone 2. The sides of the bridges 116 are contoured to conform generally to the sides of the rollers 6 so that the rollers 6 are retained around the cone 2 in the absence of the cup 4. Also, each bridge 116 along its bottom surface has a groove 118 that opens inwardly toward the axis x of rotation, the groove commencing within the large end ring 112 and extending all the way to the small end ring 114. Moreover, the end of the groove 118 that is at the large end ring 112 is located closer to the axis of rotation than the end of the groove 118 that is at the small end ring 114, and the depth of the groove 118 diminishes progressively toward the small end ring 114.

As the lubricating oil discharges from the end of the lubricant channels 50 some of it produces an oil film on the large end faces 30 of the rollers 6 as previously explained. Some of it also flows outwardly and collects in the portions of the grooves 118 near the large end rings 112. That which enters the grooves 118 flows along the grooves 118 under the influence of the centrifugal forces in the rotating cage 110, and in a short time the oil completely fills and overflows from the grooves 118. Upon leaving the grooves 118 the oil flows outwardly along the sides of the bridges 116 where some of it is picked up by the side faces of the rollers 6. More of it, however, is flung outwardly against cup raceway 26 where it is deposited on the side faces of the rollers and carried to the cone raceway 14. In this manner regions of contact between the side faces of the rollers 6 and the cone and cup raceways 14 and 26 are adequately lubricated without locating an oil jet at the space between the small diameter ends of cone and cup raceways 14 and 26.

Figure 12:
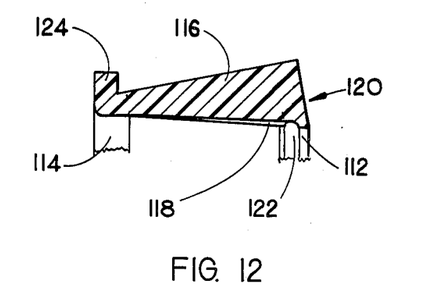
FIG. 12 is a sectional view of a modified distributing cage.

A modified distributing cage 120 (FIG. 12) is very similar to the cage 110 in that it has large and small diameter end rings 112 and 114 and bridges 116 extended between them. Moreover, the bridges 116 have grooves 118 along them. In addition, the large end ring 112 has a circumferential groove 122 which opens inwardly and catches the oil that flows outwardly from the ends of the lubricant channels 50 in the lubricating ring 10. The circumferential groove 122 along its sides opens into the ends of the bridge grooves 118. Thus the groove 122 facilitates the collection of the lubricating oil and distributes it to the bridge grooves 118. The cage 122 is further provided with the integrally formed clips 124 which project outwardly from the small end ring, and locate opposite the back face of the cup 4. The clips 124 serve to unitize the bearing A for handling purposes, that is, they make it self-contained.

Figure 13:
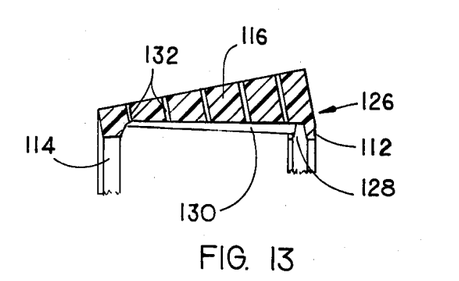
FIG. 13 is a sectional view of another modified distributing cage.

Another modified cage 126 (FIG. 13) also has large and small end rings 112 and 114 connected by bridges 116. The large end ring 112 further has a relatively deep circumferential groove 128, whereas each bridge 116 has a relatively deep groove 130 which at its one end opens into the side of the circumferential groove 128. Both grooves 128 and 130 open inwardly toward the axis of rotation so that the former will capture oil that is flung outwardly, while the latter will convey that oil axially through the bearing. However, in contrast to the bridge grooves 118, the oil does not overflow from the bridge grooves 130, at least to any significant extent. Instead, it passes out to the cup raceway 26 through a series of holes 132 that extend from the bridge groove 130 to the outwardly presented surface of the cage 126.

Figure 14:
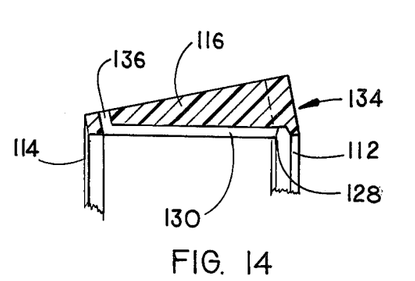
FIG. 14 is a sectional view of still another modified distributing cage.

Still another modified cage 134 (FIG. 14) is quite similar to the cage 126, in that it has large and small end rings 112 and 114, bridges 116 and grooves 128 and 130. However, instead of a series of holes in each bridge 116 to distribute the oil to the cup raceway 26, it has only a single hole 136 in each bridge 116, that hole being located near the small end ring 114. The oil which discharges from the holes 136 flows outwardly to cup raceway 26 near the small diameter end of the raceway 26 and is pumped through the bearing by the rollers 6 in the usual manner.

Figure 15:
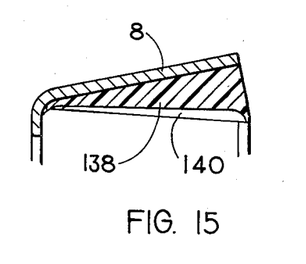
FIG. 15 is a sectional view of a pressed steel cage provided with inserts for further distributing the lubricant to the cup raceway.

The distributing cage, whatever its configuration need not be molded entirely from plastic. Instead, a conventional pressed steel cage, such as the cage 8, may be fitted with polymer inserts 138 (FIG. 15) along its bridges; the inserts 138 being bonded securely to the cage bridges. Each insert has an inwardly opening groove 140 that functions similar to the grooves 118 in the bridges 116 of the cage 110.

Figure 16:
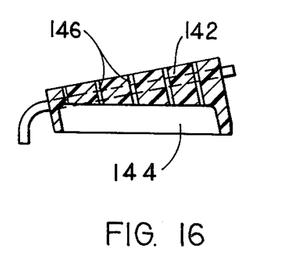
FIG. 16 is a sectional view of a further modified pressed steel cage and inserts for it.

In another variation, every other bridge of a pressed steel cage, such as the cage 8, may be cut away and in effect eliminated. In its place the cage is fitted with a polymer insert 142 (FIG. 16) having a relatively deep groove 144 that opens inwardly and a series of holes 146 that lead from the groove 144 to the outwardly presented surface of the insert 142. The oil collects in the grooves 144 of the inserts and is distributed to the cup raceway 26 through the holes 146.

This invention is intended to cover all changes and modifications of the examples of the invention herein chosen for purpose of the disclosure which do not constitute departures from the spirit and scope of the invention.

What is claimed is:

1. A tapered roller bearing comprising: a cone having a tapered raceway and a generally axially directed surface at the large end of the tapered raceway; a cup surrounding the cone and having a tapered raceway located opposite to the raceway of the cone; tapered rollers interposed between and contacting the tapered raceways of the cone and cup to enable the cone to rotate easily relative to the cup; and a lubricating ring mounted in a fixed position on and against the generally axially directed surface of the cone, the ring forming on the cone a trough that opens toward the axis of rotation for the bearing, the ring further enclosing axially directed channels that extend along the axially directed surface, each channel opening at its one end into the trough and at its other end toward the large ends of the tapered rollers, the region at which the trough opens toward the axis of rotation being located closer to the axis of rotation than the ends of the channels that open toward the large ends of the tapered rollers, whereby a fluent lubricant that is introduced into the trough will be conveyed by centrifugal force through the channels to be discharged against the tapered rollers when the cone rotates within the cup.

2. A bearing according to claim 1 and further comprising a cage for separating the rollers, the cage having bridges that extend between adjacent rollers and means for collecting lubricant after it is discharged from the ring and for directing that lubricant against the raceway of the cup near the small end of that raceway, said means being at least in part on the bridges of the cage.

3. A bearing according to claim 1 wherein the ring has an abutment face which is located adjacent to the raceway of the first race and the tapered rollers have large end faces which bear against the abutment face of the ring.

4. A tapered roller bearing according to claim 1 wherein the cone has a thrust rib that projects generally radially beyond the large end of its tapered raceway and the large ends of the tapered rollers are against the thrust rib; and wherein the axially directed surface of the cone is on its thrust rib.

5. A bearing according to claim 4 wherein the lubricating ring fits over and around the rib of the cone.

6. A bearing according to claim 4 wherein the rib has an abutment surface against which the rolling elements bear and a radially directed surface spaced from the abutment surface; wherein the axially directed surface extends generally between the abutment surface and the radially directed surface; and wherein the ring extends along the radially directed surface and the axially directed surface.

7. A bearing according to claim 6 wherein the ring has a radially directed lip that is spaced from the radially directed surface of the thrust rib, and the lip of the ring and the radially directed surface of the thrust rib form the trough.

8. An antifriction bearing comprising: a first race having a raceway and a rib projecting radially beyond one end of the raceway, the rib having a generally axially directed surface; a second race encircling the first race and having a raceway located opposite to the raceway of the first race; rolling elements interposed between and contacting the raceways of the two races to enable one of the races to rotate easily relatively to the other of the races, the rolling elements further being against the rib on the first race; and a lubricating ring mounted on the generally axially directed surface of the rib for the first race such that the ring fits over and around the rib and is fixed in position with respect to the rib, the ring having a trough that opens toward the axis of rotation for the bearing, the ring further enclosing channels that extend from the trough and open toward the rolling elements, the channels being located between the ring and the rib and being enclosed by both the ring and the rib, the region at which the trough opens toward the axis of rotation being located closer to the axis of rotation than the ends of the channels that open toward the rolling elements, whereby a fluent lubricant that is introduced into the trough will be conveyed by centrifugal force through the channels to be discharged against the rolling elements.

9. An antifriction bearing comprising: a first race having a raceway and a rib projecting radially beyond one end of the raceway, the rib having an abutment surface located adjacent to the raceway, a radially directed surface spaced from the abutment surface, and a generally axially directed surface extending generally between the abutment surface and the radially directed surface; a second race encircling the first race and having a raceway located opposite to the raceway of the first race; rolling elements interposed between and contacting the raceways of the two races to enable one of the races to rotate easily relative to the other of the races, the rolling elements further bearing against the abutment surface on the rib of the first race; and a lubricating ring mounted on and extending along the generally axially directed surface of the rib for the first race such that the ring fits over and around the rib and is fixed in position with respect to the ring, the ring terminating generally flush with the abutment surface of the rib, the ring also extending along the radially directed surface to form a trough that opens toward the axis of rotation for the bearing, the ring further enclosing channels that extend from the trough and open toward the rolling elements, the region at which the trough opens toward the axis of rotation being located closer to the axis of rotation than the ends of the channels that open toward the rolling elements, whereby a fluent lubricant that is introduced into the trough will be conveyed by centrifugal force through the channels to be discharged against the rolling elements.

10. A bearing according to claim 9 wherein the ring has a shoulder which abuts against the radially directed surface of the thrust rib and thereby serves to axially locate the ring on the thrust rib.

11. An antifriction bearing comprising: a first race having a raceway and a rib projecting axially beyond one end of the raceway, the rib having an abutment surface located adjacent to the raceway, a radially directed surface spaced from the abutment surface, and a generally axially directed surface extending generally between the abutment surface and the radially directed surface; a second race having a raceway located opposite to the raceway of the first race; rolling elements interposed between and contacting the raceways of the two races to enable one of the races to rotate easily relative to the other side of the races, the rolling elements further bearing against the abutment surface on the rib of the first race; and a lubricating ring mounted on and extending along the generally axially directed surface of the rib for the first race such that the ring fits over and around the rib and is fixed in position with respect to the rib, the ring also extending along the radially directed surface to form a trough that opens toward the axis of rotation for the bearing, the ring further containing grooves which form channels that extend along both the radially directed surface and the axially directed surface of the rib, with each at one end opening into the trough and at its other end opening toward the rolling elements, the radially and axially directed surfaces of the rib together with the ring serving to enclose the sides of the channels, the region at which the trough opens toward the axis of rotation being located closer to the axis of rotation than the ends of the channels that open toward the rolling elements, whereby a fluent lubricant that is introduced into the trough will be conveyed by centrifugal force through the channels to be discharged against the rolling elements.

12. In combination with a tapered roller bearing having a cone provided with an outwardly presented tapered raceway and a thrust rib at the large end of the raceway, a cup surrounding the cone and having an inwardly presented tapered raceway located opposite to the raceway on the cone, and tapered rollers located between and in contact with the raceways of the cone and cup, the tapered rollers further having their large diameter ends against the thrust rib on the cone, the improvement comprising: a ring fitted over the thrust rib of cone and mounted in a fixed position with respect to the cone, the ring having a radial portion which is configured to form on the cone a trough that opens inwardly toward the axis of rotation for the bearing, the ring also having an axial portion that is press fitted over the thrust rib at an inwardly presented surface on that portion, there being along the inwardly presented surface of the axial portion a plurality of channels that lead from the trough, extend along the thrust rib, and open at their ends toward the large diameter end faces of the tapered rollers, at least the innermost portion of the trough being located closer to the axis of rotation for the bearing than the discharge ends of the channels, whereby a fluent lubricant that is introduced into the trough will flow under the influence of centrifugal force through the channels to be discharged against the large end faces of the tapered rollers.

13. The combination according to claim 12 wherein the channels are in the ring.

14. The combination according to claim 12 wherein the cone has a back face which extends radially along the thrust rib; and wherein radial portion of the ring is spaced axially from the cone back face and together with the cone back face encloses the sides of the trough.

15. The combination according to claim 12 wherein the cone has a back face that extends along the thrust rib; and wherein the radial portion of the ring has a shoulder that abuts against the cone back face and the channels also extend through the shoulder.

16. An antifriction bearing comprising: a cone having an outwardly presented tapered raceway and an abutment surface projecting outwardly from the tapered raceway at the large diameter end thereof; a cup surrounding the cone and having an inwardly presented tapered raceway located opposite to the cone raceway; tapered rollers located between and in contact with the cone and cup raceways and having their large diameter ends against the abutment face; lubricant supplying means for discharging a fluent lubricant against the large diameter end faces of the rollers in the region of the abutment face; and a cage for maintaining the proper spacing between adjacent rollers, the cage including an end ring that extends across the large diameter ends of the rollers, bridges which extend from the end ring into the spaces between adjacent rollers, and lubricant distributing means located at least in part on the bridges for collecting lubricant that is discharged from the lubricant supplying means and for directing the collected lubricant toward the cup raceway near the small diameter end of the raceway, the lubricant distributing means including inwardly opening grooves on the bridges, the bases of which are located closer to the axis of rotation for the bearing at the end ring than remote from the end ring, the lubricant distributing means also including holes that extend through the bridges from the grooves to the outwardly presented surfaces of the bridges to enable the lubricant to flow from the grooves to the cup raceway, whereby the roller side faces and raceways are lubricated with the lubricant furnished through the lubricant supplying means.

17. A bearing according to claim 16 wherein the lubricant distributing means also includes an inwardly opening circumferential groove in the end ring; and wherein the grooves in the bridges at their ends open into the circumferential groove.

* * * * *

UNITED STATES PATENT AND TRADEMARK OFFICE
CERTIFICATE OF CORRECTION

PATENT NO. : 4,400,040

DATED : August 23, 1983

INVENTOR(S) : David G. Toth, Robert S. Trump, and Robert L. Leibensperger

It is certified that error appears in the above-identified patent and that said Letters Patent is hereby corrected as shown below:

Column 4, line 24, "thrust rib 8" should be "thrust rib 18".

Column 11, line 10, "other side of the" should be "other of the".

Signed and Sealed this

Seventh Day of February 1984

[SEAL]

Attest:

Attesting Officer

GERALD J. MOSSINGHOFF

Commissioner of Patents and Trademarks